United States Patent [19]

Walling et al.

[11] Patent Number: 4,560,521

[45] Date of Patent: Dec. 24, 1985

[54] MAINTAINING HOMOGENEITY IN A MIXTURE

[75] Inventors: Jorg-Hein Walling, Beaconsfield; Gerald Arbuthnot, Chateauguay; Michael A. Shannon, Glenburnie, all of Canada

[73] Assignee: Northern Telecom Limited, Montreal, Canada

[21] Appl. No.: 597,603

[22] Filed: Apr. 6, 1984

[51] Int. Cl.[4] .......................... B29B 7/04; B29B 15/14

[52] U.S. Cl. ....................................... 264/24; 118/623; 118/640; 264/108; 264/174; 264/349; 425/3; 425/113; 425/174.8 R; 427/47; 427/48

[58] Field of Search ................... 264/24, 26, 174, 108, 264/310, 349; 427/47, 48; 425/3, 174.8 E, 174.8 R, 113; 118/640, 623

[56] References Cited

U.S. PATENT DOCUMENTS

| | | | |
|---|---|---|---|
| 1,930,788 | 10/1933 | Buckner | 264/24 |
| 2,291,720 | 8/1942 | Hukle | 427/47 |
| 3,021,230 | 2/1962 | Deriaud | 264/24 |
| 3,066,355 | 12/1962 | Schloemann et al. | 264/24 |
| 3,488,410 | 1/1970 | Downes | 264/24 |
| 3,619,866 | 11/1971 | Hofmann et al. | 425/3 |
| 3,691,130 | 9/1972 | Logvinenko | 264/24 |
| 4,000,229 | 12/1976 | Wainer | 264/24 |
| 4,209,481 | 6/1980 | Kashiro et al. | 264/24 |
| 4,250,128 | 2/1981 | Meckling | 264/24 |
| 4,440,106 | 4/1984 | Greiner et al. | 264/108 |

FOREIGN PATENT DOCUMENTS

| | | | |
|---|---|---|---|
| 772424 | 4/1957 | United Kingdom | 425/3 |
| 818881 | 4/1981 | U.S.S.R. | 425/3 |

*Primary Examiner*—Jeffery Thurlow
*Attorney, Agent, or Firm*—R. J. Austin

[57] ABSTRACT

Method and apparatus to maintain homogeneity in a mixture of a fluid carrier and a quantity of magnetically permeable particles in which the mixture within a cylindrical container is subjected to the influence of a magnetic field which rotates around the container, and which at any instant is centered about its own axis lying outside the container. The field has an axis with directional components in a circumferential sense and in the axial sense of the container. In the apparatus, the field is produced by electrical coils connected for multiphase operation, side-by-side around the container and each coil is in a circumferentially and axially inclined relationship to the container.

7 Claims, 5 Drawing Figures

MAINTAINING HOMOGENEITY IN A MIXTURE

This invention relates to the maintaining of homogeneity in a mixture.

During certain stages of some manufacturing processes, it is necessary to hold quantities of magnetically permeable particles in mixtures with fluids. Process control requirements necessitate that such mixtures consist of specific volumetric or weight quantities of such particles to the volumetric or weight quantities of the fluid to ensure that, in the finished product, the desired results are obtainable. As an example of this, in the telecommunications cable industry, it is common practice to surround each electrical conductor with at least one layer of insulation which affects the electrical performance of the conductor, e.g. by producing a desired dielectric effect. The insulation layer also helps to provide other design characteristics such as a desired nominal mutual capacitance. For various reasons, continuous inductive loadings have been proposed and occasionally used in dielectric layers of electrical conductors in the telecommunications industry. These continuous inductive loadings have comprised discrete particles of a magnetically permeable material, such as ferrite, which are dispersed throughout a dielectric layer of polymeric substance such as rubber or other plastic. One of the problems which needs to be overcome if electrical conductors with such continuous inductive loadings are to produce consistently the electrical characteristics for which they are designed is that of maintaining homogeneity in the mix with the polymeric material in a fluid state. It will be appreciated that difficulty is found in maintaining homogeneity in that a mixture prepared for application to the conductors is held within a container which allows the magnetically permeable particles to settle from the fluid polymeric material. Clearly, if the mix is not homogeneous, then a dielectric layer formed from it would necessarily have more magnetically permeable particles per unit length of conductor in some parts of the conductor length than in others. Such a structure would be unacceptable commercially because electrical characteristics, e.g. nominal mutual capacitance and continuous inductive loading would be at least partly dependent upon the quantities of particles per unit length of the conductor. Hence the varying amounts of particles along the conductor would create variations in the electrical characteristics and thus a commercially unacceptable product.

The invention provides a method of maintaining homogeneity in a mixture of a fluid carrier and a quantity of magnetically permeable particles and also an apparatus for maintaining homogeneity.

Accordingly, the present invention provides a method of maintaining homogeneity in a mixture of a fluid carrier and a quantity of magnetically permeable particles comprising:

holding the mixture within a fixed cylindrical container; and subjecting the mixture to the influence of a magnetic field which is rotating around the container and which at any instant, is centred about an axis lying outside the container and having directional components extending in a circumferential sense and in an axial sense of the container, so as to be inclined relative to the axis of the container.

In the above method according to the invention, the axis of the magnetic field moves around the container while still being inclined relative to the container axis. In a practical sense the rotation of the magnetic field is created by having coils disposed around the container to provide a plurality of phases. With the present invention, because of the inclination of the field and the rotational movement of the field, two components of movement are created in the particles. While one component is caused by the rotation of the magnetic field, the other component is caused by induced magnetic field in the particles which causes them to move with a curling motion in the direction opposite to the direction of the rotational field. The strength and direction of the magnetic field affecting the particles differ, at any instant, from one particle to the next adjacent particle. Hence, at any instant, resultant duration of movement and velocity of movement of adjacent particles caused by the two components of movement, differ slightly from one another. As a result, continuous mixing takes place.

In the method of the invention, each particle is acted upon continuously by a magnetic field with an axis the position and angle of which changes relative to the particle. The angle of the axis changes relative to each particle because the angle of inclination is also rotating to present a continuously changing direction of flux lines to the particle. Hence, the two components of movement in the particles are continuously changing in direction so that the resultant directional movement is also continuously changing.

This same effect could not be obtained in a method in which the axis of the field extended axially of the container as the magnetic field axis would always present magnetic forces acting in parallel planes upon each particle.

The invention also includes apparatus for maintaining homogeneity in a mixture of a fluid carrier and a quantity of magnetically permeable particles comprising a container for holding the mixture and a plurality of electrical coils disposed for multiphase operation, side-by-side around the container, each coil having its axis extending in a circumferentially inclined sense to the container axis.

In the above apparatus according to the invention there may be any number of phases corresponding to the number of coils. However, for convenience three coils are preferably provided to give a three-phase operation.

In one preferred arrangement, the coils are disposed around the container in vertically disposed layers with the coils in each layer disposed side-by-side for multiphase operation. With this arrangement, the coils may be connected in multiphase in series around the coils and from one layer to another. Alternatively, the phases may be selected in a pattern which is not in succession from coil to coil and layer to layer but may be from one coil in one layer to a completely separated coil in any of the layers. Two embodiments of the invention will now be described, by way of example, with reference to the accompanying drawings in which:

Figure 1:
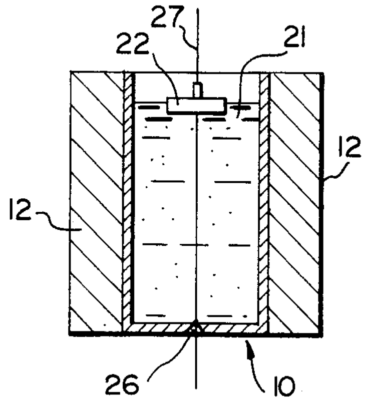
FIG. 1 is a cross-sectional view through apparatus according to a first embodiment and showing a container surrounded by coils and holding a mixture of fluid carrier and particles during a conductor coating operation.
Figure 2:
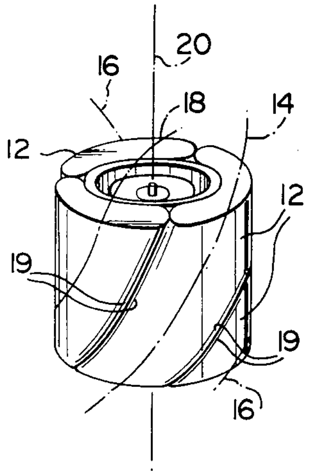
FIG. 2 is an isometric view of the apparatus of FIG. 1.

As shown by FIGS. 1 and 2, apparatus for maintaining homogeneity in a mixture of a fluid carrier and a quantity of magnetically permeable particles comprises a vertically disposed cylindrical container 10, approximately 24 inches in diameter and 48 inches in height. Surrounding the container are three coils 12 arranged in three-phase relationship.

Each of the coils 12 extends around a part of the container with the coil axis extending in a circumferentially and axially inclined sense of container. Hence, as shown by FIG. 2, the axes 14, 16, 18 of the coils 12 are inclined to container axis 20, but are also inclined relative to each other. Also, because of the resultant inclination of the coils, adjacent coils oppose each other along inclined edges 19 which extend around the container.

The apparatus is also for use to provide a layer of insulation upon an electrical conductor for a telecommunications cable. In this regard, the container holds a mixture 21 in the form of a fluid carrier, e.g. a polymeric or latex material, homogeneously containing ferrite particles. Supported by the mixture so as to float upon it, is a die means 22 having vertically disposed feedpath for conductor. The die means is free to move across the mixture dependent upon any lateral movement of conductor from its desired path which is coincident with the axis 20 of the container. This movement enables a layer of insulation containing ferrite particles to be formed concentrically around the conductor. The die means and its method of use is as described in greater detail in a copending application, filed concurrently with this application, entitled "Production of Insulated Electrical Conductors" under U.S. patent application Ser. No. 597,381, filed Apr. 6, 1984, and in the names of J. H. Walling, M. A. Shannon and G. Arbuthnot.

In use of the apparatus, an indefinite length of copper conductor of 19, 20, 22, 24 or 26 AWG is fed upwardly into the mixture 21 through a seal in orifice 26 in the base of the container. As the conductor passes upwardly and out through the die means, it becomes coated with the mixture and a die orifice (not shown) of the die means provides a layer of insulation 27 sufficient to form a desired thickness layer after drying in an oven (not shown) located above the container.

To ensure that in the finished insulation layer, the quantity and distribution of the particles per unit length is uniform, it is essential that the mixture is maintained homogeneous during coating of the conductor. Homogeneity is ensured by passing an electrical current through the three coils 12 in three-phase relationship. The current strength is sufficient to provide a magnetic field with the appropriate flux to keep the ferrite particles moving relative to one another in the carrier so as to maintain the homogeneity of the mixture. The value of this current is, for any particular situation, subject to experimentation and/or calculation and may depend upon various parameters. These parameters include the diameter of the container, the viscosity of the fluid carrier and permeability of the carrier and the particles. In this particular embodiment and when using a latex at a temperature of about 20° C. and in the container as described, it was found that a field strength of approximately 10,000 gauss was suitable for the purpose. This was producible with the particular coils described with a current of about 100 amps.

As may be seen from FIG. 2, because of the inclination of each of the axes 14, 16, 18, the magnetic field rotates around the axis 20 of the container while being at an inclined angle to that axis. Because of the relative positioning of the axes 14, 16, 18 around axis 20, the inclination of the field is constantly changing with regard to the contents of the container. At any particular instant, the inclined field acts upon each ferrite particle to produce one component of movement in the particle because of the field strength at the position of the particle. In addition, a second component of movement is caused by the induced magnetic field in the particle itself. The resultant movement of each particle is slightly different from every other particle in its immediate vicinity at the particular instant being considered. At a succeeding instant, the direction of inclination of the field has changed relative to the particles and new resultant movements are created in the particles. Thus the particles are maintained in a continuously moving and mixing condition within the carrier. Apart from the inclination of the magnetic field assisting in mixing because of its change in direction, it also provides for varying circular motions of the particles to assist in the continuous mixing procedure.

Figure 3:
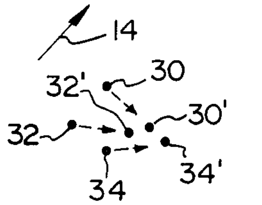
FIGS. 3 and 4 show a specific small region of the mixture in highly enlarged form to illustrate the relative movement of the particles during operation of the apparatus.
Figure 4:
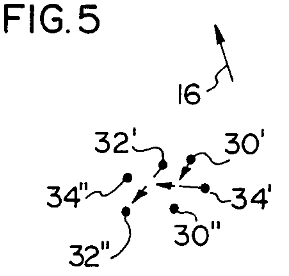

The movement of the particles in one particular minute region of the mixture is illustrated in an exaggerated manner in FIGS. 3 and 4. As shown by FIG. 3, say with coil axis 14 being the operational axis and the flux lines extending in an appropriate direction, three ferrite particles 30, 32, 34 have resultant movements for instance in the directions shown to new positions 30', 32', 34'. Upon the inclination of the magnetic field changing in the next instant to that centered upon axis 16 as shown in FIG. 4, the particles then move to positions 30", 32", 34", i.e. in different directions of resultant movement from those shown in FIG. 3.

The method of the invention has the benefit that it does not subject the carrier to a high shearing action such as may cause agglomerations of the ferrite particles and disturb homogeneity of the mixture. In contrast to the method of the invention, it is known that mechanical stirring devices such as agitator paddles or recirculating pumps may cause sufficiently high shear upon a carrier such as latex with an undesirable agglomerating effect. As is typical in most fluid flow situations, there is a minimal amount of motion of the fluid at the boundary interface, which in turn aids overall mixing by supply of a radially diminishing coefficient layer friction.

Figure 5:
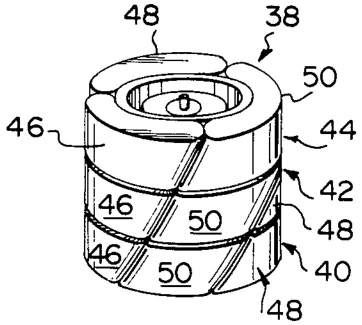
FIG. 5 is an isometric view of a second embodiment.

In a second embodiment, as shown in FIG. 5, apparatus 38 is as described in the first embodiment except that it is provided with a plurality of container encircling bands of coils, one band above another. Each band 40, 42, 44 comprises three coils 46, 48, 50, each having its axis circumferentially extending around the container and inclined to the axis 20 as in the first embodiment.

In use, the coils may be connected together in any number of phase relationships desired. In one relationship, the coils of each band are connected together in a three-phase circuit and each circuit is operated in turn to energize the bands of coils in succession.

Alternatively, the coils are connected in a prearranged order which may bear no relationship to their physical locations. For instance, for creation of the rotating field, after a coil in one band is energized, the next coil for energization may be in the next adjacent band or the further band. Hence, in an example pattern for coil energization, coil 46 in band 44 is energized after coil 48 in band 40, the next coils to be energized then being coil 50 in band 42 and coil 46 in band 40. This type of pattern while being prearranged, gives an effect similar to that achieved if the coils were energized at random. As will be appreciated, energization of the coils from band-to-band creates relatively weak and strong flux regions in different vertical regions within the mixture and these relative strengths change with the phase change and assist in mixing. Further, the rotation of the magnetic field around the axis 20 may be caused to change direction as desired merely by energizing a next succeeding coil positioned in the opposite directional sense from the rotational direction that the magnetic field is presently taking around axis 20.

In the above embodiments, the apparatus described are used both for maintaining homogeneity of the mixture and for providing a layer of the fluid mixture upon a conductor by passage of the conductor through the container. In modifications (not shown) of the above embodiments, two containers are used. A first of these containers merely contains the fluid carrier and the magnetically permeable particles and is provided with the surrounding coils to maintain homogeneity in the mixture. This container, i.e. mixing container, is connected by a passage to the second or application container to transfer the mixture thereto. A conductor then passed through the application container is provided with its layer of the mixture.

What is claimed is:

1. A method of maintaining homogeneity in a mixture of a fluid carrier and a quantity of magnetically permeable particles comprising:

holding the mixture within a fixed cylindrical container; and subjecting the mixture to the influence of a magnetic field which is rotating around the fixed container and which, at any instant, is centered about its own axis lying outside the container and having directional components extending in a circumferential sense and in an axial sense of the container, so as to be inclined relative to the axis of the container, said magnetic field created by sequentially energizing a plurality of electrical coils disposed in side-by-side relationship around the container, each coil having its axis extending in a circumferentially inclined sense to the container axis.

2. A method according to claim 1 comprising creating the magnetic field by sequentially energizing electrical coils disposed in side-by-side relationship around the container and in side-by-side relationship axially of the container.

3. A method of providing a layer of insulation upon a conductor and composed of a mixture of a solidified carrier and magnetically permeable particles comprising:

providing the mixture with the carrier in fluid form;

maintaining homogeneity of the mixture by the method according to claim 1 while passing the conductor vertically through the mixture and through die means to form a surrounding layer of the mixture upon the conductor; and drying the carrier.

4. Apparatus for maintaining homogeneity in a mixture of a fluid carrier and a quantity of magnetically permeable particles comprising a fixed container for holding the mixture and a plurality of electrical coils disposed, for multiphase operation, side-by-side around the container, each coil having its axis extending in a circumferentially inclined and axially inclined sense of the container.

5. Apparatus according to claim 4 wherein three electrical coils are disposed in side-by-side relationship around the container, the coils electrically connected together for three-phase operation.

6. Apparatus according to claim 4 wherein the plurality of coils also include coils disposed axially of the container in side-by-side relationship.

7. Apparatus for providing a layer of insulation upon a conductor comprising an apparatus according to claim 4 and including a die means for passage therethrough of a conductor surrounded by mixture held by the container.

* * * * *